(12) United States Patent
Elsner (10) Patent No.: US 7,837,028 B2
(45) Date of Patent: Nov. 23, 2010

(54) RADIUS CHAIN MODULAR CONVEYOR

(75) Inventor: Dietmar Elsner, Eimeldingen (DE)

(73) Assignee: Habasit AG, Reinach (CH)

( * ) Notice: Subject to any disclaimer, the term of this patent is extended or adjusted under 35 U.S.C. 154(b) by 123 days.

(21) Appl. No.: 12/148,980

(22) Filed: Apr. 24, 2008

(65) Prior Publication Data

US 2009/0266682 A1 Oct. 29, 2009

(51) Int. Cl.
*B65G 17/06* (2006.01)
(52) U.S. Cl. ...................... 198/850; 198/853
(58) Field of Classification Search ............ 198/778, 198/850, 853
See application file for complete search history.

(56) References Cited

U.S. PATENT DOCUMENTS

| | | | |
|---|---|---|---|
| 3,939,964 A | 2/1976 | Poerink | |
| 4,276,980 A | 7/1981 | Oizumi | |
| 4,880,107 A | 11/1989 | Deal | |
| 4,934,517 A | 6/1990 | Lapeyre | |
| 5,174,439 A | 12/1992 | Spangler et al. | |
| 5,346,059 A | 9/1994 | Irwin | |
| 5,558,208 A | 9/1996 | Kucharski | |
| 5,921,379 A | 7/1999 | Horton | |
| 6,036,001 A | 3/2000 | Stebnicki et al. | |
| 6,142,295 A | 11/2000 | Greve | |
| 6,382,405 B1 | 5/2002 | Palmaer | |
| 6,401,914 B1 | 6/2002 | Greve | |
| 6,471,048 B1 | 10/2002 | Thompson, Jr. et al. | |
| 6,474,464 B1 | 11/2002 | Horton et al. | |
| 6,644,466 B2 * | 11/2003 | Knott et al. | 198/850 |
| 6,672,451 B1 | 1/2004 | Thompson, Jr. et al. | |
| 6,837,367 B1 | 1/2005 | Klein et al. | |
| 6,910,572 B2 * | 6/2005 | Shibayama et al. | 198/850 |
| 7,070,043 B1 | 7/2006 | MacLachlan et al. | |
| 2006/0118395 A1 | 6/2006 | Stebnicki et al. | |
| 2006/0124437 A1 | 6/2006 | Ulsh et al. | |
| 2007/0175736 A1 | 8/2007 | Bickel, Jr. et al. | |
| 2007/0181409 A1 | 8/2007 | Damkjaer | |

FOREIGN PATENT DOCUMENTS

WO 98/06648 A1 2/1998

* cited by examiner

*Primary Examiner*—James R Bidwell
(74) *Attorney, Agent, or Firm*—Hodgson Russ LLP (57) ABSTRACT

A radius chain conveyor structure and method for traveling along curved paths in both left and right directions and having the capability to carry very small and delicate articles.

32 Claims, 8 Drawing Sheets

RADIUS CHAIN MODULAR CONVEYOR

FIELD OF THE INVENTION

The invention relates to conveyor belts, and more particularly to modular plastic conveyor belts of the radius type.

BACKGROUND OF THE INVENTION

Radius chain modular conveyors include single modules of a specific width connected in one single longitudinal line and capable of flexing laterally and bending around a curve either to both sides or to one side only. The design of such a conveyor presents a number of engineering challenges. Providing such a conveyor with the capability of transporting delicate and very small articles can add to the challenges.

Examples of modular conveyors operable along curved paths are found in the following United States patents. U.S. Pat. No. 5,174,439 disclosed a conveyor having a high percentage of open area and link element clearances for cleanability and flow-through and for maximizing collapsed link clearances during turning on curves to prevent build-up of foreign material on the conveyor modules. U.S. Pat. No. 5,346,059 is directed to a conveyor belt operable on short radius turns wherein the belt is either of the right turn or left turn type. A right turn belt must be physically inverted to operate as a left turn belt and vice-versa. The conveyor as shown and described in U.S. Pat. No. 5,921,379 includes structure for traveling around a curve in one direction only, i.e. not in both left and right directions. In the conveyor of U.S. Pat. No. 6,036,001 transmission of the tension or load is due to abutting and interlocking engagement between structures on the modules and independently of receipt of hinge pins in the modules. U.S. Pat. No. 6,382,405 discloses a conveyor for traversing curves, but because of openings defined by a module deck structure and gaps between adjacent modules, the patent indicates that small objects are not carried on the conveyor belt.

While the foregoing approaches have offered some improvements for use in radius chain modular conveyors, there remains a definite need to provide a radius chain modular conveyor and method of operating the same for traveling along curved paths in both left and right directions and capable of carrying very small and delicate articles.

SUMMARY OF THE INVENTION

This invention addresses the above-described need by providing an improved radius chain conveyor structure and method for traveling along curved paths in both left and right directions and having the capability to carry very small and delicate articles.

BRIEF DESCRIPTION OF THE DRAWINGS

The invention is illustrated in the drawings in which like reference characters designate the same or similar parts throughout the figures of which.

DETAILED DESCRIPTION

As previously mentioned, there is a definite need to provide a radius chain modular conveyor and method of operating the same for traveling along curved paths in both left and right directions and capable of carrying very small and delicate articles. In addition, it would be desirable to provide such a conveyor and method wherein the transition from a straight run to a radius or curved run is smooth and nearly symmetrical, the longitudinal forces on the chain are well distributed on the straight run as well in the curve and the open area in the chain is reduced to a minimum.

The invention addresses the foregoing needs by providing an improved radius chain conveyor structure and method of operating the same. In one embodiment thereof, the lengths of the links provided with slots as well as the lengths of the slots themselves increase from the center portion of the conveyor module toward the outer edges, allowing the links to collapse the chain on one side and fan out on the opposite side when the chain travels along a curved path. In another embodiment thereof, the article supporting surface on the module is maximized in longitudinal and lateral directions, and the gaps associated with the links of the module are minimized.

Figure 1:
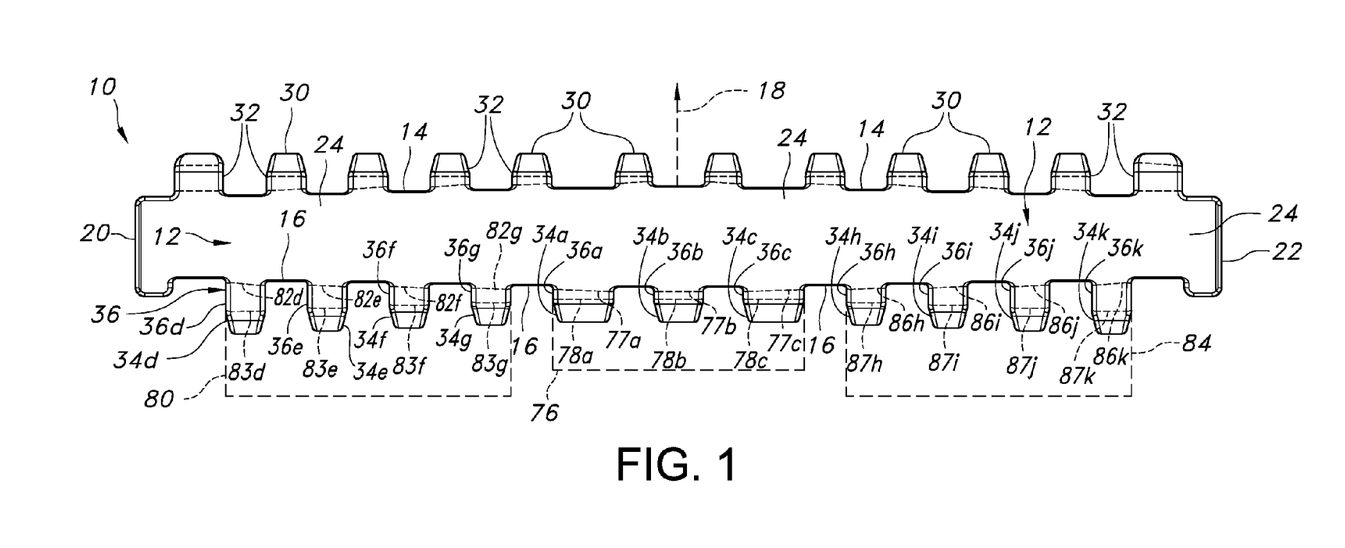
FIG. 1 is a top plan view of a module of an embodiment of the invention for use in a radius chain conveyor.
Figure 2:
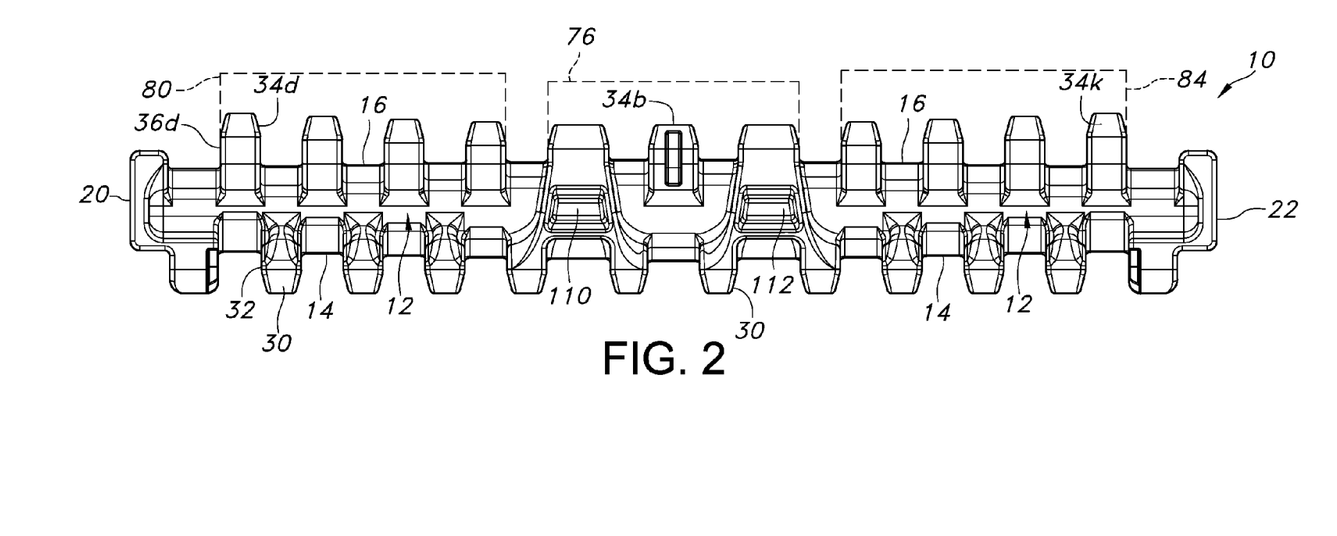
FIG. 2 is a bottom plan view of the module of FIG. 1 rotated about an axis extending between the ends of the module.

Referring to FIGS. 1 and 2, there is shown a radius chain conveyor module 10 according to an embodiment of the invention. Module 10 includes a body 12, typically molded from plastic material, which extends longitudinally from one side 14 to an opposite side 16 in the direction of travel 18 of the module 10 when it is installed in a conveyor (not shown). With reference to the direction of travel indicated by line 18, side 14 is leading and side 16 is trailing. Module body 12 extends laterally from one end 20 to an opposite end 22. Module body 12 has an article supporting surface 24 which extends continuously along substantially the entire distance between the sides 14, 16 and which extends continuously along substantially the entire distance between the ends 20, 22. Thus, there are no openings or gaps in the article supporting surface 24 which is continuously solid between the sides 14, 16 and the ends 20, 22 of the body 12. This feature contributes to the advantage of carrying very small and delicate articles such as cigarettes as will be described in further detail presently.

Module 10 further includes a first set of a plurality of laterally spaced links 30 each extending longitudinally from the one side 14 of the module body. Each of the links 30 has a passage therethrough for receiving a pivot rod or the like (not shown in FIGS. 1 and 2) when the module 10 is linked to an adjacent module (not shown in FIGS. 1 and 2) in a chain conveyor. One such passage 32 is indicated in FIGS. 1 and 2, it being understood that each link 30 includes a passage like that designated 32. The passages or apertures are in lateral alignment to receive the afore-mentioned pivot rod. The number of links 30 in module 10 shown in FIGS. 1 and 2 is illustrative, and the particular number will be determined by the structural and operational requirements of the conveyor in which module 10 is included. Module 10 also includes a second set of a plurality of laterally spaced links 34 each extending longitudinally from the opposite side 16 of the module body 12. Each of the links 34 has a longitudinally extending slot therethrough for receiving a pivot rod or the like (not shown in FIGS. 1 and 2) when module 10 is linked to an adjacent module (not shown in FIGS. 1 and 2). One such slot 36 is indicated in FIGS. 1 and 2, it being understood that each link includes a slot like that designated 36. The slots are located so that the afore-mentioned pivot rod can extend through all the links 34 and slots 36. The number of links 34 in the module 10 shown in FIGS. 1 and 2 is illustrative, the particular number being determined by the structural and operational requirements of the conveyor in which the module is included.

Figure 3:
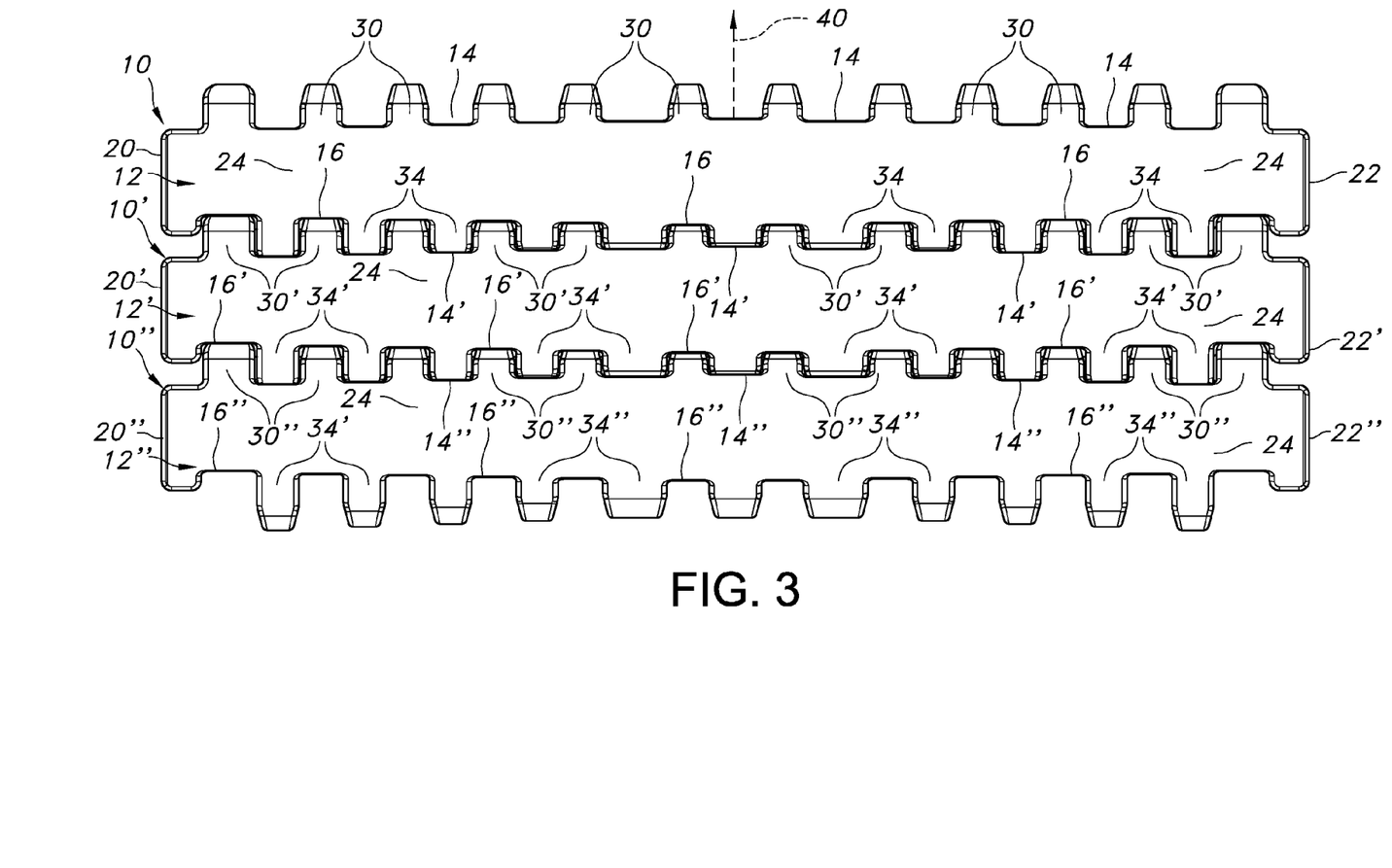
FIG. 3 is a top plan view of three of the modules of FIG. 1 linked together in a portion of a radius chain conveyor and as they would be disposed when the conveyor belt is traveling along a straight path.
Figure 4:
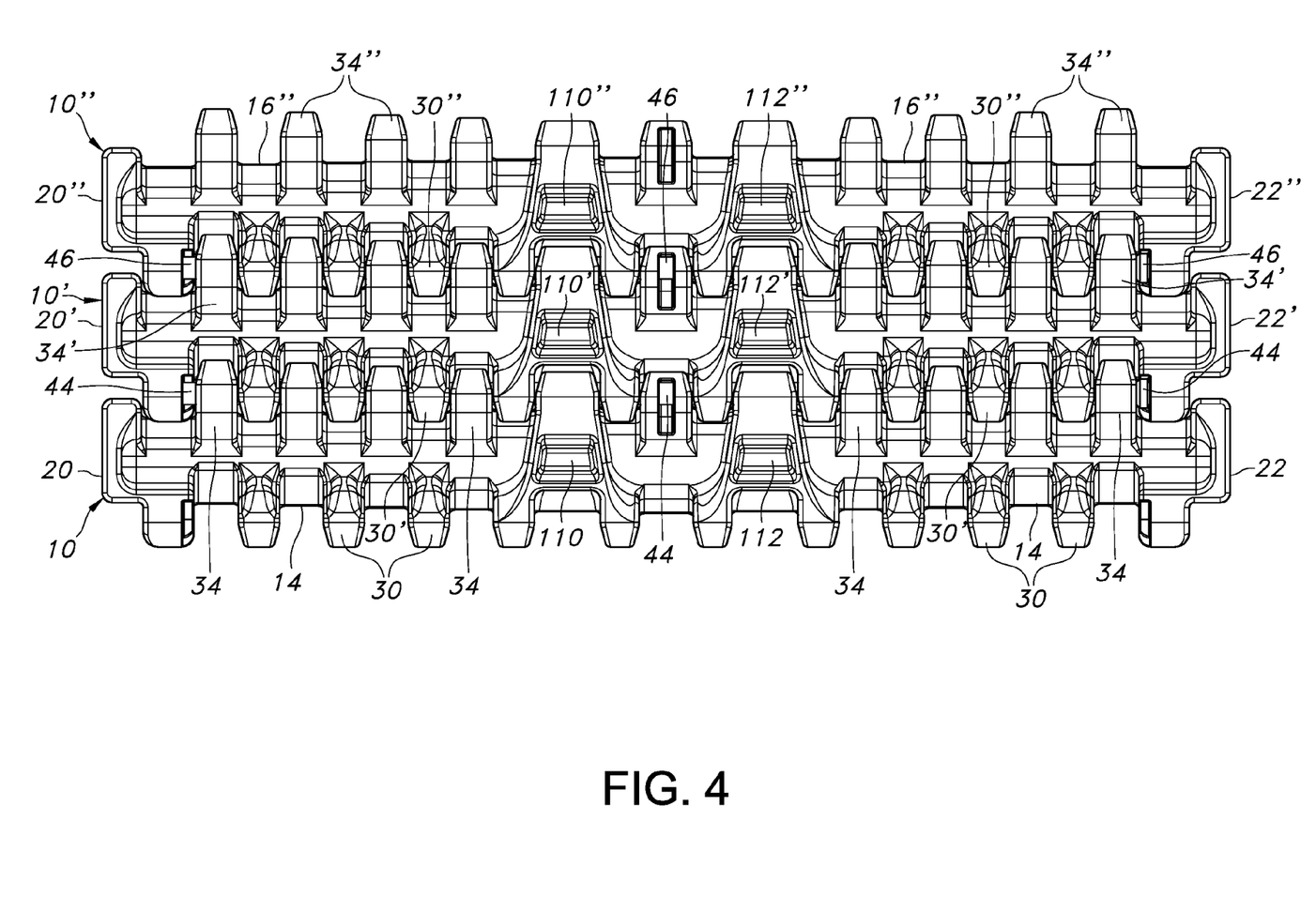
FIG. 4 is a bottom plan view of the arrangement of FIG. 3 rotated about an axis extending between the ends of one of the modules.

FIGS. 3 and 4 show a plurality of modules, only three for convenience in illustration, as they would appear linked together in a portion of a radius conveyor and as they would be disposed when the conveyor belt is traveling along a straight path. The direction of travel of the modules along that path is indicated by the dashed line 40. Module 10 includes apertured links 30 and slotted links 34, module 10' includes apertured links 30' and slotted links 34' and module 10" includes apertured links 30" and slotted links 34". As shown in FIGS. 3 and 4, the slotted links 34 of module 10 are interleaved or intercalated in closely spaced relation with the apertured links 30' of module 10', and the slotted links 34' of module 10' are linked or intercalated in closely spaced relation with the apertured links 30" of module 10". The slots and apertures of links 34 and 30', respectively, are laterally aligned so as to receive a pivot rod 44 or the like which links modules 10 and 10' together. Similarly, the slots and apertures of links 34' and 30", respectively, are laterally aligned so as to receive a pivot rod 46 or the like which links modules 10' and 10" together.

In the arrangement illustrated in FIGS. 3 and 4, sides 14 and 16 of module 10, sides 14' and 16' of module 10' and sides 14" and 16" of module 10" are disposed substantially parallel to each other and substantially perpendicular to the straight path direction of travel 40 of a conveyor in which they are located. Ends 20 and 22 of module 10 are disposed substantially parallel to each other and to the direction of travel 40, ends 20' and 22' of module 10' are substantially parallel to each other and the direction of travel 40, and ends 20" and 22" of module 10" are substantially parallel to each other and to the direction of travel 40.

As mentioned previously, only three modules are shown in the arrangement of FIGS. 3 and 4 for convenience in illustration. An actual conveyor would include a large number of modules linked together in a manner like the modules 10, 10' and 10" of FIGS. 3 and 4 and included along the entire length of the conveyor chain or belt. Thus, module 10 by means of links 30 and a pivot rod (not shown) would be linked to a module (not shown) located at one end of the series of additional modules included in the conveyor belt. Similarly, module 10" by means of links 34 and a pivot rod (not shown) would be linked to a module (not shown) located at the opposite end of the series of additional modules included in the conveyor belt or chain.

In order to transport small and delicate articles effectively, the conveyor containing modules 10, 10' and 10" etc. needs to provide a smooth conveying surface which is closed as much as possible. Preferably, the percent open area in the conveying surface should be no greater than about one percent on average when the conveyor travels along a straight path. In addition, the largest opening between the intercalated links should preferably not be wider than 2.5 mm (0.1 inch) in its smaller extension to avoid small particles being pinched or falling through. As previously described, there are no gaps or openings in the article supporting surface 24 of each module 10, 10', 10" etc. wherein each surface 24 is continuously solid between the sides 14, 16 and the ends 20, 22 of each module body 12. In addition, the longitudinally extending spaces or gaps between the links 30 of one module and the intercalated links 34 of an adjacent module and the laterally extending spaces or gaps between the outer ends of the links 30, 34 on one module and the surface of an adjacent module are minimized to provide the aforementioned limit of the percent open area.

The foregoing is illustrated further by the following example. Each module in an arrangement like that shown in FIG. 3, by way of example, has overall dimensions of 18-21 mm measured between sides 14 and 16 and 228 mm measured between ends 20 and 22. Each of the apertured links 30 has a length of about 7 to 8 mm measured generally parallel to the direction of travel 40 and a width of about 8.3 mm measured generally perpendicular to the direction of travel 40. Each gap between a link 30 on one module and a link 34 on the adjacent module, measured in a direction between ends 20, 22 is about 0.3 mm. This measurement is for the gap between the links intercalated on the assembled modules on both link sides (total clearance of link in space would be 0.6 mm). The central link 34 has a width of about 8.3 mm measured perpendicular to the direction of travel 40, the two links 34 which straddle the central link each is about 8.3 mm in width, and each of the remaining links 34 has a width of about 8.3 mm. Adjacent modules are linked by the pivot rods so that the outer ends of links 30 just clear the side 16 of the adjacent module so as not to interfere with pivotal movement and so that the longest ones of the links 34 just clear the side 14 of the adjacent module so as not to interfere with pivotal movement. A conveyor having modules with the foregoing dimensional specifications has a percent open area of about 0.6 percent on average when the modules are disposed in the manner shown in FIG. 3 during travel of the conveyor along a straight path. When traveling in the curve the open area will increase on the outer section of the chain and reduce on the inner section. The average value over the total chain width will increase from 0.6% to 1.3%.

The links 30 of the first set on each module 10 are substantially of the same length in a longitudinal direction, i.e. parallel to the straight path direction of travel 40. As previously mentioned, the passages or apertures 32 are in lateral alignment on each module 10 to receive a pivot rod. The pivot rod is held in defined position by links 30 containing apertures 32 when the conveyor belt is running. The geometry of each link 34 and included slot 36 of the second set of links is selected so that when the direction of travel of a conveyor including the modules 10 is along a curved path, the modules pivot about a pivot point referenced to a longitudinal centerline of the modules by collapsing on an inner portion of a curve and fanning out on an outer portion of a curve. The longitudinal centerline is substantially parallel to and located between the ends 20, 22 of each module 10, and will be defined in further detail presently. In the arrangement shown and described herein, the selected geometry which causes the foregoing includes the relative lengths of the links 34 and slots 36 as will now be described in detail.

Referring first to FIGS. 1 and 2, the links 34 of the second set on each module 10 are arranged to include a first or central section 76 located generally centrally between the first and second ends 20 and 22, respectively, of the module body 12. The first section 76 includes at least one link and slot. Preferably section 76 includes a plurality of links and slots, in order to provide a stable straight run of the conveyor chain, and the illustrative module 12 includes three links and slots in section 76, i.e. link 34a and slot 36a, link 34b and slot 36b and link 34c and slot 36c. The particular number of links and slots is of course determined by the structural and operational requirements of the conveyor in which module 10 is included. In the first or central section 76, the links 34a, 34b and 34c are of substantially the same length in a longitudinal direction, i.e. in a direction parallel to the direction of travel 18. Likewise, the slots 36a, 36b and 36c are of the same length in a longitudinal direction, i.e. in a direction parallel to the direction of travel 18. In addition, each of the slots 36a, 36b and 36c has an inner end, for example inner ends 77a, 77b and 77c, respectively, closest to side 16 of module body 12, and an outer end, for example ends 78a, 78b and 78c, respectively, spaced longitudinally from the inner ends. The inner ends of the slots 36a, 36b and 36c are aligned transversely relative to the direction of travel 18. In the first section 76, the outer ends of the slots are substantially equidistant from the inner ends thereof.

The links 34 of the second set on each module 10 are arranged to include a second section 80 located between the first or central section 76 and one of the ends of module body 12, i.e. end 20. Section 80 includes a plurality of links and slots, and the illustrative module 12 includes four links and slots in section 80, i.e. link 34d and slot 36d, link 34e and slot 36e, link 34f and slot 36f and link 34g and slot 36g. This number of links and slots in section 80 is by way of example, for convenience in illustration, the particular number being determined by the structural and operational requirements of the conveyor in which module 10 is included. In addition, successive links and slots of section 80 proceeding in a direction from the first or central section 76 to end 20 of module body 12 increase in length in a longitudinal direction, i.e. parallel to direction 18. Thus link 34g and slot 36g are longer than the links and slots of section 76, link 34f and slot 36f are longer than link 34g and slot 36g, respectively, link 34e and slot 36e are longer than link 34f and 36f, respectively and link 34d and slot 36d are longer than link 34e and slot 36e, respectively. In particular, each of the slots 36d, 36e 36f and 36g has an inner end, for example inner ends 82d, 82e, 82f and 82g, respectively, closest to side 16 of module body 12, and an outer end, for example outer ends 83d, 83e, 83f and 83g, respectively. The outer ends of the slots are located at successively greater distances from the inner ends thereof proceeding in a direction toward end 20 of module body 12. In particular, outer end 83g is spaced further from side 16 than the outer ends of the slots in section 76, outer end 83f is spaced further from side 16 than outer end 83g, outer end 83e is spaced further from side 16 than outer end 83f and outer end 83d is spaced further from side 16 than outer end 83e.

The links 34 of the second set on each module 10 are arranged to include a third section 84 located between the first or central section 76 and the opposite end 22 of module body 12. Section 84 includes a plurality of links and slots, and the illustrative module 12 includes four links and slots in section 84, i.e. link 34h and slot 36h, link 34i and slot 36i, link 34j and slot 36j and link 34k and slot 36k. This number of links and slots in section 84 is by way of example, for convenience in illustration, the particular number being determined by the structural and operational requirements of the conveyor in which module 10 is included. Usually the number of links and slots is the same in both sections 80 and 84. In addition, successive links and slots of section 84 proceeding in a direction from the first section 76 to end 22 of module body 12 increase in a longitudinal direction, i.e. parallel to direction 18. Thus, link 34h and slot 36h are longer than the links and slots of section 76, link 34i and slot 36i are longer than link 34h and slot 36h, respectively, link 34j and slot 36j are longer than link 34i and slot 36i, respectively, and link 34k and slot 36k are longer than link 34j and slot 36j, respectively. In particular, each of the slots 36h, 36i, 36j and 36k has an inner end, for example inner ends 86h, 86i, 86j and 86k, respectively, closest to side 16 of module body 12, and an outer end, for example outer ends 87h, 87i, 87j and 87k, respectively. The outer ends of the slots are located at successively greater distances from the inner ends proceeding in a direction toward end 22 of module body 12. In particular, outer end 87h is spaced further from side 16 than the outer ends of the slots in section 76, outer end 87i is spaced further from side 16 than outer end 87h, outer end 87j is spaced further from side 16 than outer end 87i and outer end 87k is spaced further from side 16 than outer end 87j.

Figure 7:
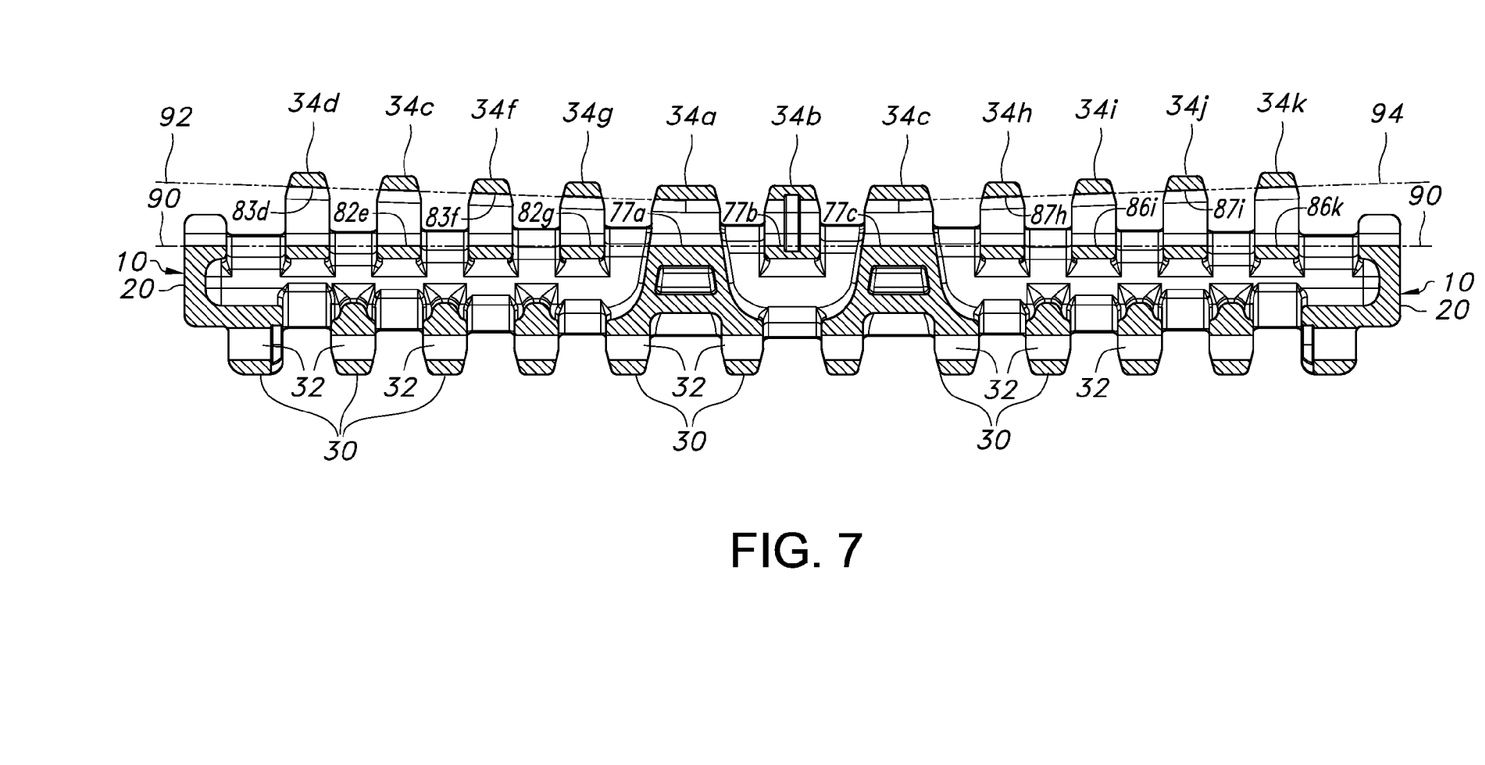
FIG. 7 is a sectional view of the module shown in FIG. 2.

The foregoing is illustrated further in FIG. 7, which is a sectional view of the module 10 shown in FIG. 2 taken between the ends 20 and 22. In particular, the broken line 90 in FIG. 7 shows the transverse alignment of the inner ends of the slots, i.e. the transverse alignment of inner ends 77a-77c of the slots in the first or central section 76, inner ends 82d-82g of the slots in the second section 80 and inner ends 86h-86k of the slots in the third section 84. The broken line 92 shows the outer ends 83g-83d of the slots in the second section 80 being located at successively greater distances from the inner ends thereof proceeding toward end 20 of module body 12. Similarly, the broken line 94 shows the outer ends 87h-87k of the slots in the third section 84 being located at successively greater distances from the inner ends thereof proceeding toward end 22 of module body 12.

As previously described, the first or central section 76 includes at least one link 34 and slot 36. The outer end of the slot is generally semi-circular or arcuate in shape or cross-section and the passages in the first set of links 30 are generally circular in shape or cross-section. The pitch of a module 10 is defined by the distance between the center of a passage in a link 30 and the center of a radius of the outer end of the slot of a corresponding link 34. The distance is in a direction parallel to the direction of travel designated 18 in FIGS. 1 and 2. Also as previously mentioned, the first section 76 of the links 34 preferably includes a plurality of links and slots, three being shown for purpose of illustration. When the first section 76 includes a center link and one or more links on each side of the center link, the distance between the radius of the outer end of the center link 34 and the center of the passage in the corresponding link 30 defines the pitch of the module when the direction of travel of the conveyor is along a straight path, the aforementioned distance being in a direction parallel to travel direction 18. Furthermore, when the first section 76 includes a plurality of links 34 and slots 36, the pulling force in the chain when the conveyor travels on a straight run will be distributed on those center links 34 having the same length. Any center links 34 having longer slots have clearance to the pivot rod and therefore do not transmit any force.

The foregoing structure and arrangement of the links and slots have been shown and described for the one illustrative module 10. The same structure and arrangement of links and slots is provided on each module included in the conveyor belt or chain.

Figure 5:
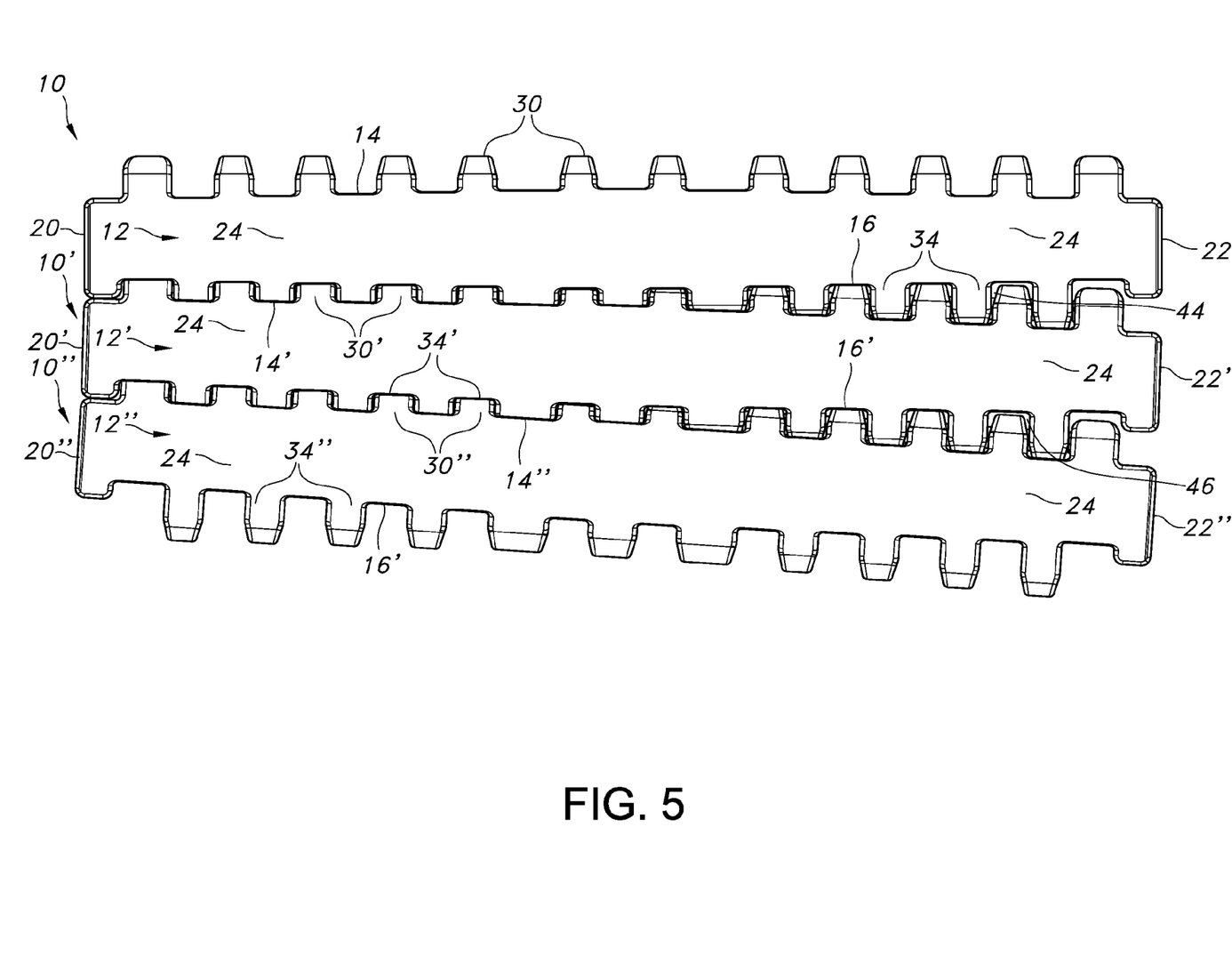
FIG. 5 is a view similar to FIG. 3 showing the disposition of the three modules when the conveyor in which they are contained is traveling along a right side curved path.
Figure 6:
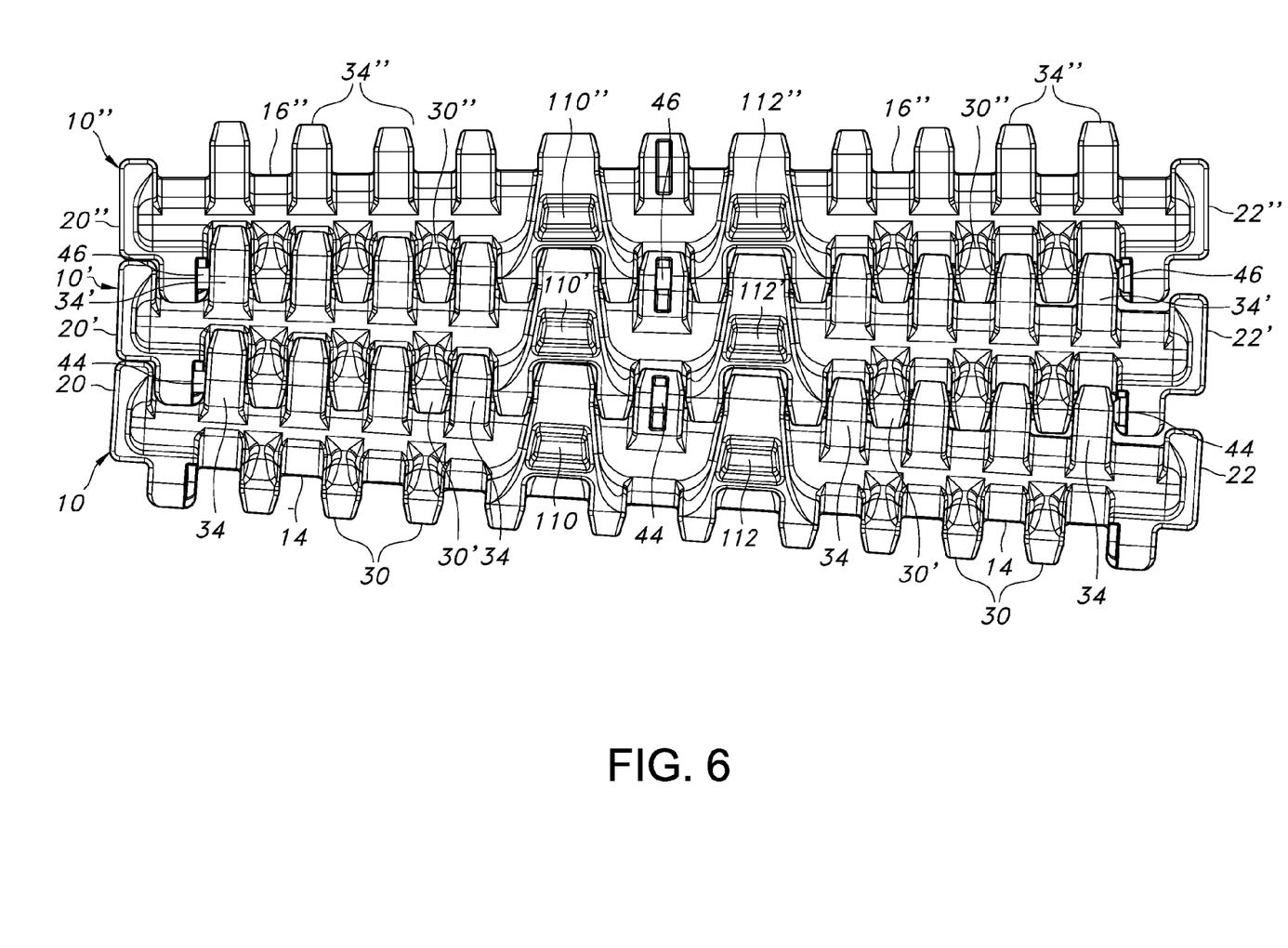
FIG. 6 is a bottom plan view of the arrangement of FIG. 5.

FIGS. 5 and 6, which show a plurality of modules 10, 10' and 10" linked together similar to FIGS. 3 and 4, respectively, illustrate the arrangement of modules as it would appear when the conveyor is on a radius run, i.e. traveling on a curved path. When rounding a curve, the conveyor chain pivots along the pivot axis by collapsing on the inside of the curve and at the same time fanning out on the outside of the curve, the pivot axis being offset by (x) from the longitudinal center line which is midway between the module ends as shown in FIG. 7. A radius run through a curved path on the right-hand side is illustrated in FIGS. 5 and 6. The ends 22, 22' and 22" of the modules fan out on the right-hand side of the conveyor belt as viewed in FIGS. 5 and 6, and the ends 20, 20' and 20" collapse on the opposite side of the conveyor belt. The opposite occurs during a radius run through a curved path on the left-hand side. In particular, the ends 20, 20' and 20" of the modules would fan out and the ends 22, 22' and 22" would collapse.

Figure 8:
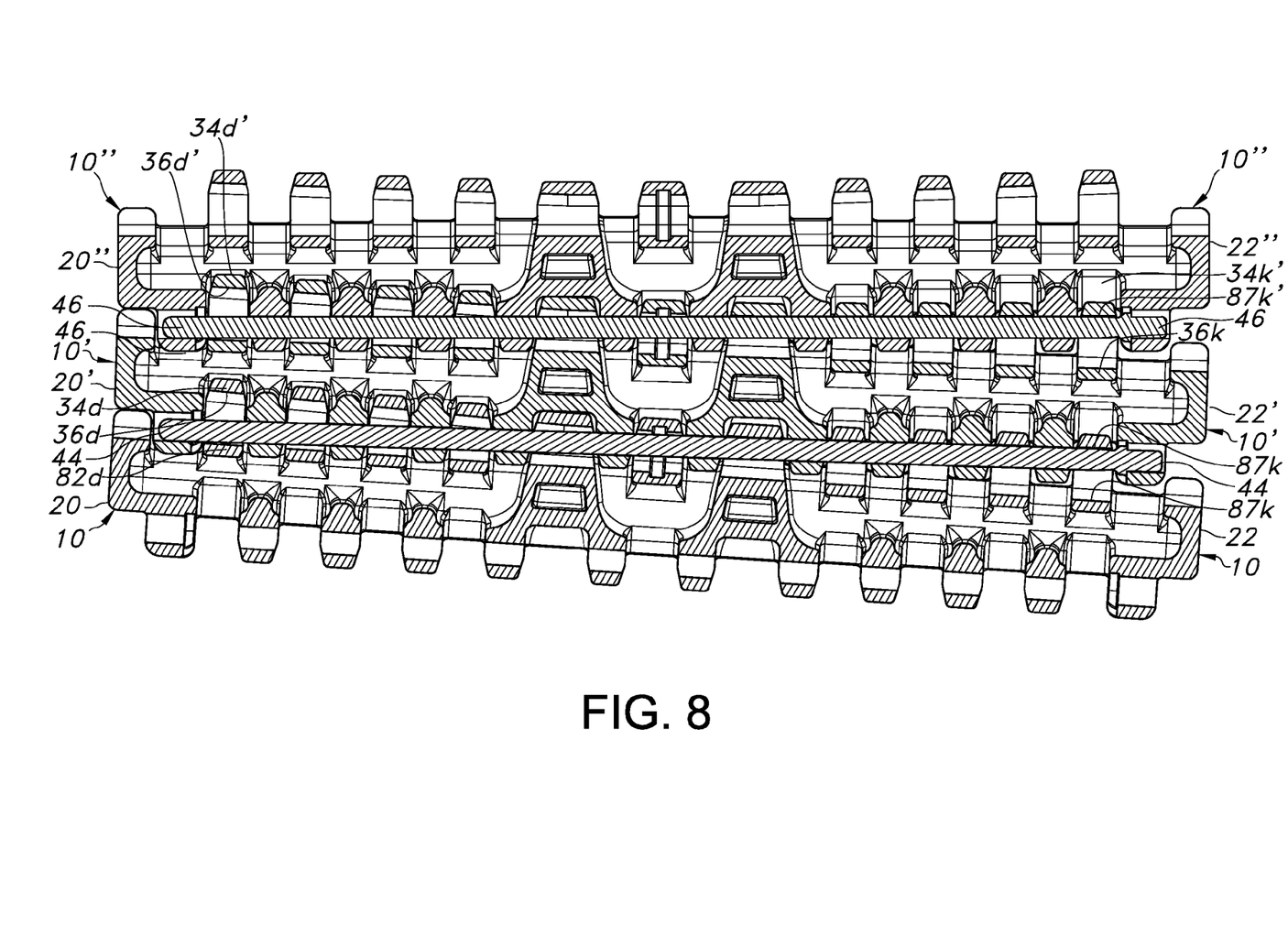
FIG. 8 is a sectional view of the arrangement of modules shown in FIG. 6 and illustrating the relationship between the pivot rods and the slots in the links.

FIG. 8 is a sectional view of the arrangement of FIG. 6 and showing the relationship between the pivot rods 44 and 46 and the slots 36 in the links when a conveyor containing the modules is traveling along a curved path. Pivot rod 44 is rotatably received in the apertures 32' of links 30' of module 10'. The right-hand portion of pivot rod 44 contacts outer ends 87h-87k of slots 36h-36k, respectively, in links 34h-34k of module 10. The left-hand portion of pivot rod 44 is spaced from the inner ends 82d-82g of slots 36d-36g in links 34d-34g of module 10. The spacing decreases in a direction proceeding toward end 20. Similarly, pivot rod 46 is rotatably received in the apertures 32' of links 30" of module 10". The right-hand portion of pivot rod 46 contacts the outer ends 87h'-87k' of slots 36h'-36k' in links 34h'-34k' of module 10'. The left-hand portion of pivot rod 46 is spaced from the inner ends 82d'-82g' in links 34d'-34g' of module 10'. The spacing decreases in a direction toward end 20.

When the conveyor chain enters a curve, the link 34 with the shortest slot in the center section 76 functions as the pivoting point. The afore-mentioned pivot axis about which the modules pivot extends through that pivot point. If there are a plurality of links 34 in center section 76, for example three links with the same short slot length, the pivot point is defined by the outermost center section link on the left side for a right-hand curve and by the outermost center section link on the right side for a left-hand curve and is offset from the centerline by the measure x (FIG. 7).

When the conveyor chain enters a curve, it is desired to have the pulling force distributed to all links 34 between the links in the center section 76 and the edge of the chain. Therefore, the length variation in the slots is designed to allow the pivot rod to contact the slot end on all those links at a specific angle. As shown in FIG. 8, in a right-hand curve, pivot rod 44 contacts ends 87h-87k of slots 36h-36k, respectively, and pivot rod 46 contacts ends 87h'-87k' of slots 36h'-36k', respectively. Only two pivot rods 44 and 46 are shown for convenience in illustration. The pivot rods associated with the additional modules along the portion of the length of the conveyor chain in the right-hand curve would contact slot ends of the links of those modules in a manner similar to that shown in FIG. 8. In a left-hand curve, pivot rod 44 would contact ends 83d-83g of slots 36d-36g, respectively, and pivot rod 46 would contact ends 83d'-83g' of slots 36d'-36g', respectively. Likewise, only the two pivot rods 44, 46 are shown for convenience in illustration, and the pivot rods associated with the additional modules along the portion of the length of the conveyor chain in the left-hand curve would contact slot ends of the links 34 of those modules.

Figure 12:
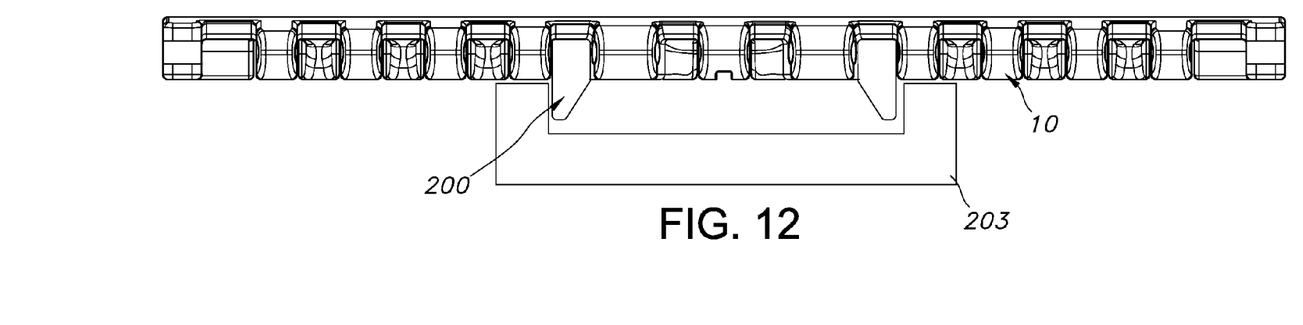

The afore-mentioned specific angle α at which the pivot rod contacts the slot ends is measured between the pivot rod and the transversal module axis which is perpendicular to the chain running direction. This angle is identical to the angle between the single pivot rods and constant throughout the curve. This angle defines the curve radii which is the spreading of the modules on the outside of the curve, also referred to as "fanning out". The angle is determined by the following formula: alpha=arctan [pitch divided by (inner radius+chain width/2+offset)] where the pitch p is measured at the pivot point spaced from the chain center line by the distance x. The radius defined by the angle is used to design the specific conveyor frame which achieves that radius. For easier specification of the conveyor design the minimum radius is specified for every particular belt type. Alternatively, the collapse factor is provided which is defined as: collapse factor Q=R/b (R=inner radius, b=chain width). The design of the frame needs to incorporate a side guard profile usually made of plastic with low coefficient of friction or stainless steel. The radius of any curve needs to be dimensioned to meet the specified minimum radius of the chain in order to allow the chain to run under optimal conditions with the links of the second or third section in firm contact with the pivot rod. Alternatively, and commonly used in the beverage industry, the chain may be furnished with tabs 200 on the bottom of the belt (FIG. 12). The tabs 200 fit inside a U-shaped guide 203. In this case the radius differs from the definition given by the above formulas and will be specified for the specific design individually.

A radius chain conveyor having the modules shown and described herein has a collapse factor between about 2 to about 3. The smaller the collapse factor the more difficult it is to achieve a small open area. For the proposed design, of 3 allows nearly 0% open area on the straight run. However, in the curve outside section the open area will not be 0, but approximately double the value for the straight run, ideally less than one percent.

In a radius chain conveyor having the modules shown and described herein the change from straight run to radius run is smooth and nearly symmetrical by collapsing on one side and fanning out on the other belt side. The longitudinal forces on the chain are well distributed over several links on the straight run as well as in the curve. The illustrative modules shown and described herein include a preferred arrangement with three center links having the same short slots. It is possible to have fewer center links or a greater number of center links depending primarily on the width of the conveyor chain in which the modules are contained.

Figure 9:
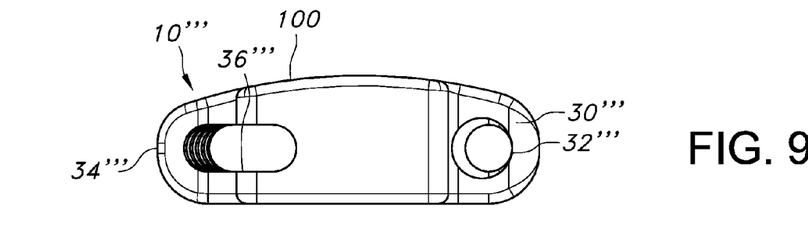
FIG. 9 is an enlarged end elevational view of a module according to an embodiment of the invention having a curved article supporting surface.

The illustrative modules 10 shown and described herein have an article supporting surface 24 which is relatively flat. FIG. 9 shows a module 10'" having an article supporting surface 100 which is convex curved in shape. Surface 100 is curved in a longitudinal direction, i.e. in the direction of travel of the conveyor.

Figure 10:
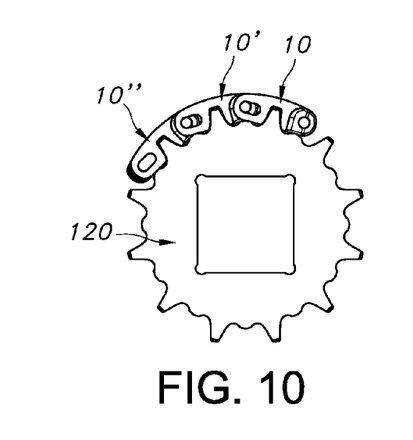
FIG. 10 is an end elevational view illustrating a conveyor sprocket engaging an arrangement of modules like those shown herein.
Figure 11:
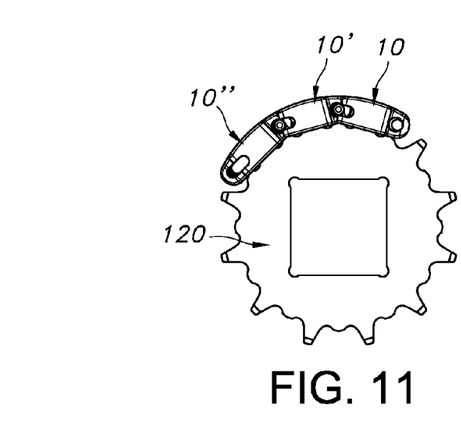
FIG. 11 is a cross-sectional view of the sprocket and arrangement of FIG. 10; and, FIG. 12 is an end view of a belt of the present invention disposed in a U-shaped guide.

The illustrative modules 10 shown and described herein include two cavities 110, 112 for sprocket engagement. Persons skilled in the art are readily aware of many other possibilities for designing a sprocket drive with only one cavity, more than two cavities, or with no cavities at all. FIGS. 10 and 11 show the manner in which the toothed wheel 120 of a sprocket drive engages the modules of a conveyor belt or chain, for example modules 10, 10' and 10".

As persons skilled in the art are aware, the pivot rod retaining structures of the ends of the conveyor modules are merely illustrative of several kinds of rod retaining structures such as clips, offset holes and the like.

While the invention has been described in connection with certain embodiments, it is not intended to limit the scope of the invention to the particular forms set forth, but, on the contrary, it is intended to cover such alternatives, modifications, and equivalents as may be included within the spirit and scope of the invention.

What is claimed is:

1. A modular conveyor for moving product in a direction of travel along straight and curved paths comprising:
    a plurality of conveyor modules arranged in a succession along the direction of travel of the conveyor, each module having a body extending longitudinally in the direction of travel of the conveyor from a first side to a second side and extending laterally from a first end to a second end, the module body having an article supporting surface;
    a first set of a plurality of closely spaced links each extending longitudinally from the first side of a module body, each of the links having a passage therethrough for receiving a pivot rod;
    a second set of a plurality of closely spaced links each extending longitudinally from the second side of the module body, each of the links having a longitudinally extending slot therethrough for receiving a pivot rod;
    adjacent modules being interconnected by the first set of links intercalated with the second set of links of an adjacent module and by pivot rods extending through the intercalated links; and
    wherein the links of the second set are arranged to include a first section located generally centrally between the first and second ends of the module body, a second section located between the first section and the first end of the module body, and a third section located between the first section and the second end of the module body, there being at least one link and slot in the first section, successive links and slots of the second section proceeding in a direction from the first section to the first end of the module body increasing in length in a longitudinal direction relative to the direction of travel of the conveyor, and successive links and slots of the third section proceeding in a direction from the first section to the second end of the module body increasing in length in a longitudinal direction.

2. The conveyor according to claim 1, wherein the first section includes a plurality of links and corresponding slots, the links and slots of the first section being of substantially the same length in a longitudinal direction relative to the direction of travel of the conveyor.

3. The conveyor according to claim 1, wherein each of the slots has an inner end closest to the second side of the module body and an outer end spaced longitudinally from the inner end, the inner ends of the slots being transversely aligned relative to the direction of travel of the conveyor.

4. The conveyor according to claim 3, wherein the first section includes at least one link and slot and the outer end of the slot is a given distance from the inner end thereof, the outer ends of the slots of the second section being located at successively greater distances from the inner ends thereof proceeding in a direction from the first section toward the first end of the module body, and the outer ends of the slots of the third section being at located at successively greater distances from the inner ends thereof proceeding in a direction from the first section toward the second end of the module body.

5. The conveyor according to claim 3, wherein the first section includes a plurality of links and corresponding slots, the outer ends of the slots of the first section being substantially equidistant from the inner ends thereof.

6. The conveyor according to claim 3, wherein the outer ends of the slots are generally semicircular in shape and the passages in the first set of links are generally circular in shape, and wherein the pitch of a module is defined by the distance between the center of a passage and the center of a radius of an outer end of a slot.

7. The conveyor according to claim 6, wherein the outer end of the at least one slot of the at least one link of the first section defines the pitch of a module.

8. The conveyor according to claim 7, wherein the first section includes a center link and a plurality of links on each side of the center link, and wherein the outer end of the slot of the center link defines the pitch of a module when the direction of travel of the conveyor is along a straight path.

9. The conveyor according to claim 1, wherein the first section includes a plurality of links and corresponding slots which are of substantially the same slot length, and wherein when the conveyor enters a curved path in the direction of travel of the conveyor the outermost link on the left-hand end of the first section defines a pivot point for a right-hand side of the curved path and the outermost link on the right-hand end of the first section defines a pivot point for a left-hand side of the curved path.

10. The conveyor according to claim 3, wherein the lengths of the slots of the second section are of a magnitude such that a pivot rod operatively engages the outer ends of the slots at a predetermined angle which results in force being distributed to all links in the section between the first section and the first end of the module when the direction of travel of the conveyor is along a curved path.

11. The conveyor according to claim 10, wherein the predetermined angle is measured between the transversal module axis and a line parallel to the outer end of the slots in the second section.

12. The conveyor according to claim 10, wherein the predetermined angle defines the curve radii of the fanning out of the first ends of the modules.

13. The conveyor according to claim 3, wherein the lengths of the slots of the third section are of a magnitude such that a pivot rod operatively engages the outer ends of the slots at a predetermined angle which results in force being distributed to all links in the section between the first section and the second end of the module when the direction of travel of the conveyor is along a curved path.

14. The conveyor according to claim 13, wherein the predetermined angle is measured between the transversal module axis and a line parallel to the outer end of the slots in the third section.

15. The conveyor according to claim 13, wherein the predetermined angle defines the curve radii of the fanning out of the second ends of the modules.

16. The conveyor according to claim 1, wherein the conveyor has a collapse factor of from about 2 to about 3.

17. The conveyor according to claim 1, wherein the article supporting surface of each module extends continuously along substantially the entire distance between the first and second sides and extends continuously along substantially the entire distance between the first and second ends.

18. The conveyor according to claim 17, wherein the percent open area of the conveyor is less than about one percent in the straight run.

19. The conveyor according to claim 17, wherein the percent open area of the conveyor is less than about two percent in the curve.

20. The conveyor according to claim 17, wherein the article supporting surface is substantially curved in a longitudinal direction substantially parallel to the direction of travel of the conveyor.

21. A method of operating a modular conveyor for moving product along straight and curved paths comprising:
providing a plurality of conveyor modules arranged along the length of the conveyor and each comprising a body having apertured links extending from one side and links having slots extending from the opposite side;
linking adjacent ones of the modules by pivot rods extending through the apertured links of one module and the link slots of an adjacent module along the length of the conveyor, wherein the links having slots are arranged to include a first section located generally centrally between the first and second ends of the module body, a second section located between the first section and the first end of the module body, and a third section located between the first section and the second end of the module body, there being at least one link and slot in the first section, successive links and slots of the second section proceeding in a direction from the first section to the first end of the module body increasing in length in a longitudinal direction relative to the direction of travel of the conveyor, and successive links and slots of the third section proceeding in a direction from the first section to the second end of the module body increasing in length in a longitudinal direction;
causing the pivot rods to extend generally perpendicular to the direction of travel of the conveyor along a straight path; and
causing the modules to pivot about a pivot point referenced to a longitudinal centerline of the modules by collapsing on an inner portion of a curve and fanning out on an outer portion of a curve when the direction of travel of the conveyor is along a curved path.

22. The method according to claim 21, further comprising causing the pivot rods to contact portions of the slots and extend at a predetermined angle with respect to the straight path disposition of the pivot rods so as to distribute the pulling force among the links when the direction of travel of the conveyor is along a curved path.

23. The method according to claim 22, wherein the predetermined angle is measured between the transversal module axis and a line parallel to the outer end of the slots in the second section.

24. The method according to claim 22, further comprising utilizing the predetermined angle to define the curve radii of the fanning out of the conveyor modules.

25. The method according to claim 21, wherein the collapse factor of the conveyor is from about 2 to about 3.

26. The method according to claim 21, further comprising providing each of the conveyor modules with an article supporting surface extending continuously along substantially the entire distances between the ends and the sides of the conveyor module bodies and linking the conveyor modules in a manner so as to minimize the open area of the conveyor.

27. The method according to claim 26 wherein the percent open area of the conveyor is less than about one percent in the straight run.

28. A module for a linked chain conveyor comprising:
a module body extending longitudinally in the direction of travel of the module in a conveyor from one side to an opposite side of the module and extending laterally from one end to an opposite end thereof, the module body having an article supporting surface extending continuously along substantially the entire distance between the sides and extending continuously along substantially the entire distance between the ends so as to minimize the open area in a conveyor containing the module;
a first set of a plurality of laterally spaced links each extending longitudinally from the one side of the module body, each of the links having a passage therethrough for receiving a pivot rod when the module is linked to an adjacent module in a chain conveyor;
a second set of a plurality of laterally spaced links each extending longitudinally from the opposite side of the module body, each of the links having a longitudinally extending slot therethrough for receiving a pivot rod when the module is linked to an adjacent module in a chain conveyor; and
adjacent modules being interconnected by the first set of links intercalated with the second set of links of an adjacent module and by pivot rods extending through the intercalated links; and
wherein the links of the second set are arranged to include a first section located generally centrally between the first and second ends of the module body, a second section located between the first section and the first end of the module body, and a third section located between the first section and the second end of the module body, there being at least one link and slot in the first section, successive links and slots of the second section proceeding in a direction from the first section to the first end of the module body increasing in length in a longitudinal direction relative to the direction of travel of the conveyor, and successive links and slots of the third section proceeding in a direction from the first section to the second end of the module body increasing in length in a longitudinal direction.

29. The conveyor module according to claim 28, wherein the percent open area of a conveyor containing the module is less than about one percent in the straight run.

30. The conveyor module according to claim 28, wherein the module is combined with a plurality of substantially identical modules operatively linked together along a conveyor chain in a manner so as to minimize the open area of a conveyor containing the modules.

31. The conveyor module according to claim 28, wherein the article supporting surface is substantially flat.

32. The conveyor module according to claim 28, wherein the article supporting surface is substantially curved in a longitudinal direction substantially parallel to the direction of travel of a conveyor containing the module.

* * * * *